Figure 1:
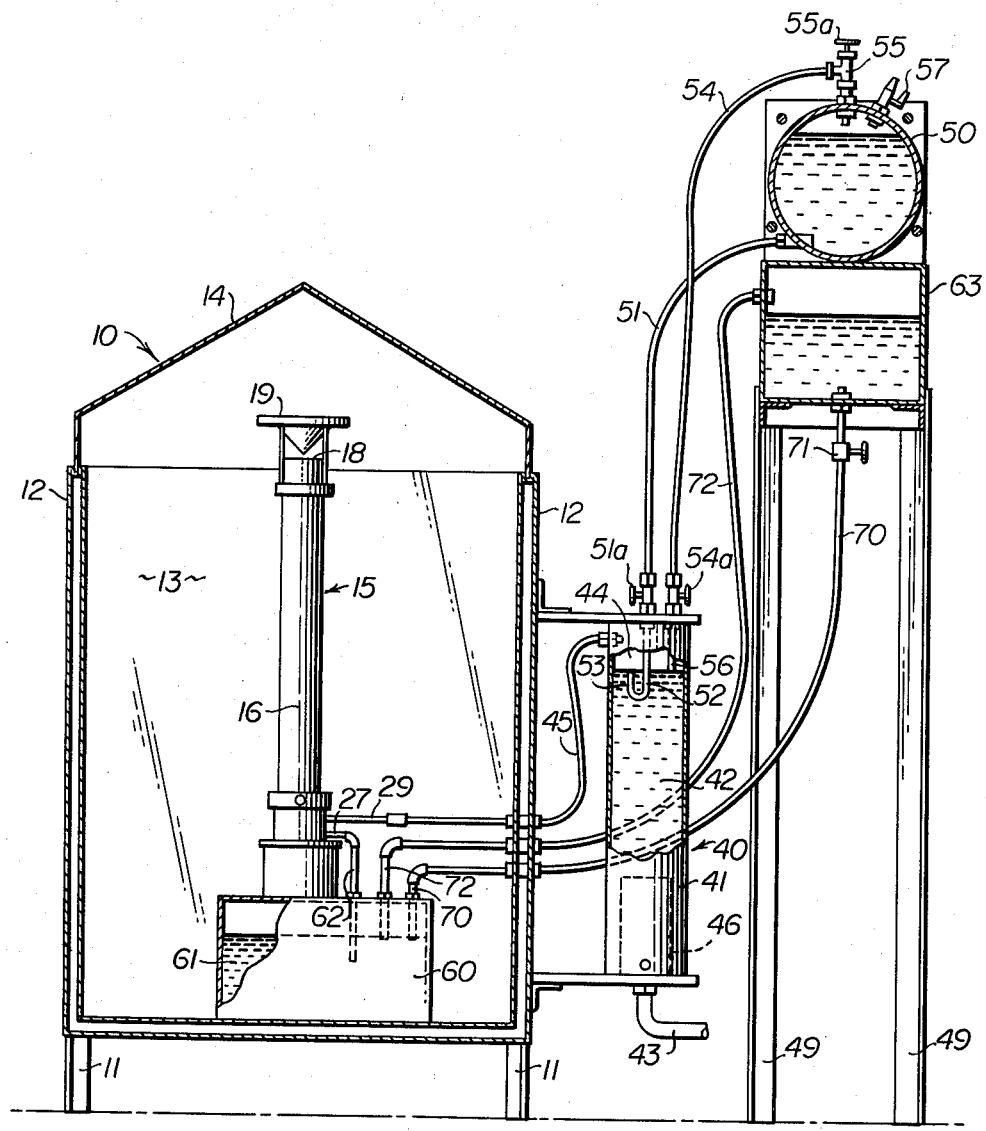
Figure 2:
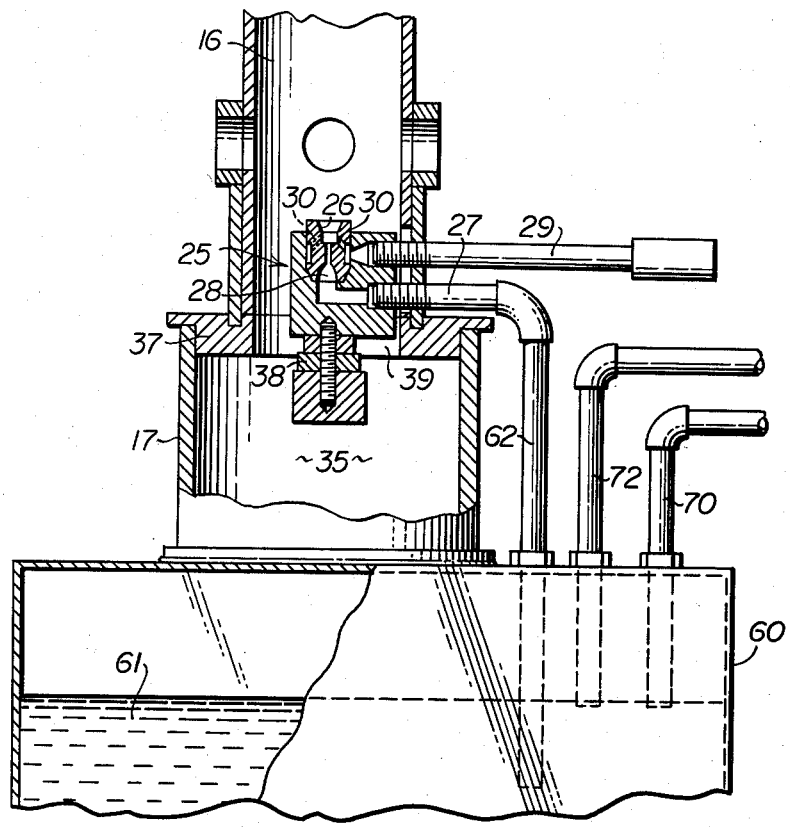

INVENTOR.
THOMAS R. GILL

INVENTOR.
THOMAS R. GILL
BY Watts & Fisher, Attys.

United States Patent Office 3,163,497
Patented Dec. 29, 1964

3,163,497
CORROSION TESTING APPARATUS
Thomas R. Gill, Pompano Beach, Fla., assignor to
The G.S. Equipment Company
Filed Aug. 6, 1962, Ser. No. 215,158
17 Claims. (Cl. 23—253)

The present invention relates generally to test apparatus, and more specifically to a novel and improved accelerated corrosion test mechanism.

In many manufacturing operations considerable attention is directed to the corrosion testing of parts as an aid in improving corrosion resistance and establishing effective quality control programs. Notably, the automobile industry, the military, and others continually seek to improve the resistance of parts to corrosion induced by a variety of causes such as sea water and chemicals used on roads and highways to melt snow and ice. Similarly, products are exposed to other sources of corrosion such as air-entrained chemical waste and air-entrained salt mist found in areas near sea coasts.

The standard and accepted method of accelerated corrosion testing is known as "salt spray testing." According to this method, a fog-like dispersion of salt and/or other corrosion inducing material is produced in a test cabinet and allowed to settle over test specimens positioned within the cabinet. With the usual equipment, the spray is produced by an atomizing spray nozzle that is supplied with warm, moisture-laden air, as from a bubble tower wherein heated air is bubbled through a water bath to obtain the desired humidification, and by a salt solution which is aspirated from a suitably located reservoir below the nozzle.

In all salt spray testing, the control is essentially empirical and therefore it is essential to eliminate significant variables in order to obtain dependable and reproducible results. For example, in conducting comparison tests to determine which of a plurality of test specimens offers the maximum corrosion resistance, it is obviously necessary to provide standardized conditions. Similarly, effective quality control programs require standardized testing techniques capable of producing accurate and consistent test data in order that the quality of manufactured parts can be controlled. In practice, these uniform testing conditions must be reproducible in test after test conducted in the same cabinet as well as in different cabinets in different geographic locations.

The variables involved in salt spray testing may be generally categorized as being of two types, namely, the variables associated with the actual fog-producing apparatus and what may be referred to as test cabinet variables. Prior to the invention of application Serial No. 115,467, filed June 7, 1961, for Corrosion Testing Mechanism, now Patent No. 3,098,720, little attention had been given to controlling any of the variables involved in salt spray testing, and, as a result, it was almost impossible with prior art test apparatus to achieve any degree of standardization and uniformity. That invention relates to the fog-producing apparatus and provides a fog tower wherein the aspirator nozzle is disposed in a vertical tube which has its outlet end in the top portion of the test cabinet. As more fully explained in the referenced application, the fog tower is capable of producing a uniform spray mist and of obtaining uniform spray collection rates, thereby minimizing the variables associated with producing the fog spray. The present invention pertains to novel and improved control apparatus which is designed to eliminate the second class of variables referred to above, that is, the test cabinet variables.

It has been found that one significant test cabinet variable is the amount or volume of the corroding solution which contacts the tested surface. More specifically it has been shown that the test data is materially affected by the volume of solution which is sprayed from the aspirator nozzle during the test period. As noted above, it is customary to arrange the aspirator nozzle above a salt reservoir which may be located either inside or externally of the test cabinet. The vertical distance between the aspirator nozzle and the level of the salt solution in the reservoir is known as the "siphon pick-up height." It will be evident that as the solution is aspirated from the reservoir the level will drop and, concomitantly, the siphon pick-up height will increase. Thus, with the prior art arrangements, the amount of solution sprayed will decrease until at the end of some tests less than 50% of the original volume is being sprayed in comparison to the volume at the beginning of the test. While some prior art arrangements have included means for periodically replenishing the salt solution reservoir, such means was not effective to automatically control and maintain a constant level of solution in the reservoir and thereby maintain a constant siphon pick-up height. Thus, it has been difficult, if not impossible, to obtain uniform fog density in accordance with test specifications throughout any given test.

The following table of test data shows nozzle air flow in liters per minute and solution consumption in millilitters per hour at various air pressures and siphon heights. This data was prepared using the same equipment, including the same nozzle, at all air pressures and siphon heights so as to eliminate, as nearly as possible, all equipment variables.

| Siphon Height | Air Flow (l.p.m.) | | | | Solution Consumption (ml./hr.) | | | |
|---|---|---|---|---|---|---|---|---|
| | 5 p.s.i. | 10 p.s.i. | 15 p.s.i. | 20 p.s.i. | 5 p.s.i. | 10 p.s.i. | 15 p.s.i. | 20 p.s.i. |
| 4″ | 19 | 26.5 | 31.5 | 36 | 2,100 | 3,840 | 4,584 | 5,256 |
| 8″ | 19 | 26.5 | 31.5 | 36 | 636 | 2,760 | 3,720 | 4,320 |
| 12″ | 19 | 26.5 | 31.5 | 36 | 0 | 1,380 | 3,000 | 3,710 |
| 16″ | 19 | 26.6 | 31.5 | 36 | 0 | 780 | 2,124 | 2,904 |

As will be seen from the above, the solution concumption at all air pressures decreases a marked amount as the siphon height increases, while the air flow remains relatively constant. Thus, the volume of solution relative to the volume of air flow also decreases as the siphon height increases. Since the fog settling rate depends partially on the particle velocity of the fog (assuming particle sizes are similar), the increasingly greater atomizing air volume has a considerable effect on the settling rate at any given location in the test cabinet. Hence, when the siphon height is allowed to vary during a test, the volume of salt solution which contacts all of the specimens not only will decrease, but different fog settling rates will prevail throughout the cabinet. It will be seen from this that the test conditions will vary considerably and that little uniformity can be obtained.

A further detrimental result of permitting the siphon height to vary during the conduction of a test is that the performance of the nozzle itself will be seriously affected. As noted above, when the solution consumption drops off, the relative air flow from the nozzle becomes greater. This relatively greater air flow evaporates the water from the fog at the orifice of the nozzle and dries the solution in the orifice before it can be discharged. As a result, the nozzle quickly will become clogged with dried solution so that it is incapable of correctly delivering the salt solution at specific air pressures and air flow rates for which the nozzle was designed.

Another significant cabinet variable which has been found to materially affect the volume and quality of the fog is the relative humidity of the atomizing air, which should be as nearly saturated as possible. Incomplete saturation of the atomizing air will result in evaporation of water from the fog and thus change its composition, while over-saturation will result in dilution of the fog. To some extent, the relative humidity of the air can be controlled by adjusting the temperature in the bubble tower. However, fog quality also will be affected by variations of the water height in the bubble tower, presumably because humidification is incomplete when air passes through a shallow water column.

It will be evident that during operation of the test apparatus the water height in the bubble tower will continually drop off. With prior art apparatus, no means has been provided to accurately and quickly control the water height by supplying additional water to the bubble tower. As a result, the fog settling rate has been relatively unsteady and has been characterized by significant drift during unattended operation of the apparatus, as when a test is conducted over night or during a weekend.

An object of the present invention is to provide improvements in salt spray apparatus which assures uniform and consistent test results.

Another object of the invention is to provide improvements in salt spray apparatus which effectively minimize test cabinet variables, thereby making it possible to obtain reliable and reproducible test conditions.

A more specific object of the invention is to provide automatic controls which make it possible to obtain constant solution consumption during conduction of salt spray tests.

A further specific object of the invention is to provide automatic controls for maintaining complete saturation of the atomizing air during the conduction of salt spray tests.

The foregoing objects of the invention are attained and the disadvantages of prior art apparatus overcome by a novel and improved system for constantly replenishing the water in the bubble tower and the salt solution in the reservoir to which the aspirating spray nozzle is connected. As will hereinafter be explained in detail, the system is automatic and is sensitive to small changes in the volume of water and salt solution which are continually consumed during the conduction of a salt spray test. Thus, an almost constant level of water in the bubble tower and of solution in the nozzle reservoir can be maintained. By maintaining a constant level of water in the bubble tower, complete saturation of the atomizing air is assured. By maintaining a constant level of salt solution in the nozzle reservoir, the siphon pick-up height of the aspirator nozzle will remain unchanged and thereby assure a constant volume consumption of solution.

Another important feature of the invention is that the level control system includes supply reservoirs for respectively supplying water and solution to the bubble tower and nozzle reservoir. Since the level control system is automatic and since supply reservoirs are provided, constant test specifications can be met over prolonged test periods even though the test apparatus is left unattended. As distinguished from this feature of the invention, most prior art salt spray test apparatus requires the constant attention of skilled technicians.

Other objects and advantages of the invention will become apparent from the following detailed description and the accompanying drawings.

In the drawings:

FIGURE 1 is a side elevational view, partially in cross section, illustrating a salt spray test apparatus employing the novel and improved features of the present invention; and FIGURE 2 is an enlarged, fragmentary cross-sectional view of a portion of the apparatus illustrated in FIG. 1.

Referring now to the drawings, and to FIG. 1 in particular, a test cabinet is shown generally at 10. The cabinet 10 is of conventional construction and includes a corrosion resistant base 11 and corrosion resistant side walls 12 which define a test space 13. A movable cover 14, which also is resistant to corrosion, is supported by the walls 12 to provide access to the normally closed space 13. When the device is in operation, test specimens are supported on racks (not shown) which are normally positioned on brackets (also not shown) connected to the side walls 12 within the test space area 13.

In the illustrated arrangement, an aspirator assembly in the form of a fog-producing tower 15 is positioned in the space 13. The details of the fog tower 15 are fully shown and described in the above-referenced application, Serial No. 115,467 and no not form a part of the present invention. It will be understood, however, that the fog tower 15 is comprised of a vertical tube 16 which is shown as being supported on a base 17 and as having an upper outlet end 18 within the top portion of the cabinet 10. An inverted conical baffle 19 is connected to the tube 16 above the outlet end 18. The purpose of this baffle is to enhance uniform fog dispersion by radially spreading the fog in all directions from the tower across the top of the cabinet 10.

As most clearly shown in FIG. 2, an aspirator nozzle 25 is positioned within the fog tower tube 16 above the base 17. The aspirator nozzle 25 includes an outlet orifice 26 positioned to emit an air-fluid mixture vertically along the axis of the tube 16 toward the outlet end 18. A test solution conduit 27 is connected to the nozzle 25 and communicates with the outlet orifice 26 through a central passage 28. An air supply conduit 29 also is connected to the nozzle and communicates with the orifice 26 through a plurality of metering passages 30.

In the illustrated construction, the base 17 defines a liquid trap 35 which is in communication with the lower end of the tube 16. A flanged annular trap cover 37 is formed as part of the base 17 and includes a cross bar 38 which supports the aspirator nozzle 25. The cross-bar 38 and the trap cover 37 together define condensate passages 39 which permit precipitated fluid from the fog tower to fall into the trap 35 past the nozzle 25.

Referring again to FIG. 1, it will be seen that a bubble tower 40 is externally connected to one wall 12 of the cabinet 10. This bubble tower 40 includes a cylinder 41 for containing a column of water 42 that is maintained at a constant, predetermined height with the novel control system of the present invention. An air supply line 43 is connected to the bottom end of the tower 40 for supplying air from a suitable source (not shown) such as an air compressor or the like. A suitable immersion heater 46 also is disposed within the bottom end of the tower 40 for heating the water to the desired temperature. In use, the air bubbles upwardly through the heated water 42 into an air space 44 at the top of the tower. The heated and humidified air is conducted from the air space 44 in the tower to the aspirator nozzle by a conduit 45 which is connected to the air supply conduit 29. Suitable controls (not shown) may be provided for controlling the temperature and air pressure within the bubble tower.

In accordance with the present invention, there is provided a water supply reservoir tank 50 which is supported above the bubble tower 40 by an upstanding frame 49 or by other suitable means. The bottom of this tank or reservoir 50 is connected by a liquid supply conduit 51 to the top of the bubble tower 40 and to a downwardly projecting tube 52 within the tower. As shown, the tube 52 has a U-shaped end portion 53 which prevents the air bubbling upwardly in the tower from entering the tube and the conduit 51. Alternatively, the tube 52 can be straight and a suitable baffle provided to prevent the entrance of air into its lower end. A valve **51*a* also is shown as being provided between the conduit 51 and the tube 52** so that the supply of water from the reservoir can be shut off when desired.

A liquid feed control conduit 54 is connected to the top portion of the reservoir 50 by a fitting 55. The opposite end of the control line 54 is connected through a shut-off valve 54a to a control tube 56 which projects downwardly within the tower. The control tube 55 may terminate at or above the horizontal plane in which the outlet end of the liquid feed tube 52 is located.

With the illustrated arrangement, it will be seen that, when the water in the bubble tower falls below the end of the control tube 56, air will enter the control tube 56 and pass into the top of the reservoir 50 through the conduit 54. In this manner the vacuum is broken in the reservoir 50 and a flow of water from the reservoir is induced through the conduit 51 and the liquid supply tube 52 to replenish the water in the bubble tower. This flow of water will continue until the water in the bubble tower has again reached the desired height, as determined by the position of the lower end of the control tube 56. When the water level reaches the lower end of the tube 56, air will be prevented from further entering the reservoir and the flow of water will be automatically shut off.

The capacity of the reservoir tank 50 is such that water may be supplied to the bubble tower 40 over prolonged test periods in the manner described so that a constant level of water is automatically maintained in the tower. The reservoir may be refilled between tests by closing the valves 51a and 54a and adding water through an opening in the fitting 55 which is normally closed by a threaded plug 55a. For the purpose of refilling the reservoir, it has been found desirable to provide a relief valve 57 so that the pressure in the reservoir tank can be brought to atmospheric pressure.

The fog tower 15 is shown as being disposed on the top of an enclosed, nozzle reservoir 60 which contains a fixed amount of salt solution 61 calculated to produce a fog of the desired characteristics. Salt solution is supplied from the reservoir 60 to the aspirator nozzle 25 through a conduit 62. The conduit 62 is connected to the test solution supply conduit 27 and projects downwardly through the top of the reservoir 60 below the level of solution therein.

As generally discussed above, the level of the salt solution 61 within the reservoir 60 is automatically controlled by means of the present invention so as to maintain a constant siphon pick-up height between the aspirator nozzle and the solution. To this end, a test solution supply reservoir tank 63 is supported externally of the cabinet 10 above the level of the nozzle reservoir 60 by the frame 49. The reservoir 63 is provided with a normally sealed opening (not shown) so that fresh test solution can be added to the reservoir when desired.

A liquid supply conduit 70 is connected to the bottom of the supply reservoir 63 and exhausts into the nozzle reservoir 60. A suitable valve 71 may be provided between the conduit 70 and the reservoir 63 in order that the supply of liquid from the reservoir can be shut off manually, as when refilling the reservoir. A control line conduit 72, which functions in a manner similar to the water control line 54, is connected to the top of the supply reservoir 63 and extends into the top portion of the nozzle reservoir 60. It will be understood that the position of the end of the line 72 within the reservoir 60, which may be above or at the same height as the end of the conduit 70, determines the level of the test solution therein.

The operation of the level control for the nozzle supply reservoir 60 is much the same as that discussed in connection with the bubble tower level control. In summary, when the level of the solution 61 falls below the end of the line 72 that is connected to the reservoir 60, air will enter the line and pass into the top portion of the solution supply reservoir 63. This passage of air through the control line breaks the vacuum in the supply reservoir 63 and induces a flow of solution through the conduit 70 into the reservoir 60 to replace the solution which has been used up. When the level of the solution 61 again reaches a predetermined height, as determined by the position of the conduit 72, the solution will prevent air from further entering the line 72 and thereby cut off further flow of test solution from the reservoir 63.

While the novel and improved control system provided by the invention has been disclosed in conjunction with a fog tower that is centrally disposed within a test cabinet on a nozzle reservoir, it is to be understood that the control system of the invention also can be used with the more conventional arrangements of test equipment. For example, the nozzle supply reservoir 60 can be located along one side of the cabinet 10 or even externally of the cabinet, instead of being positioned below the fog tower. Further, the aspirator nozzle assembly, instead of being formed as part of a fog tower, can be of the conventional type which is located in the bottom portion of the cabinet and usually at one side thereof.

It will be apparent from the foregoing that the invention provides an effective system of automatically controlling the level of salt solution in the aspirator nozzle reservoir so that a constant siphon pick-up height can be maintained throughout a salt spray test, and of automatically controlling the level of water in the bubble tower so that complete saturation of the atomizing air is assured at all times. One significant feature of the control system resides in the separate air control lines which are provided. These control lines make the system very sensitive to small changes in the volume of water and salt solution which are consumed during the test so that fresh amounts of water and solution are, in effect, continuously supplied to the bubble tower and to the reservoir, respectively. The accurate and quick response of the control system to changes in the volume of water in the bubble tower and test solution in the nozzle reservoir is important since it assures that the test conditions in the cabinet will remain constant.

Another important feature is that the cabinet variables have been eliminated by a system which employs a simple gravity feed from external storage tanks. Thus, the system is relatively inexpensive and does not have any moving parts or valves which would be subject to corrosion and require continuing maintenance. The external storage tanks which are provided for both the water in the bubble tower and the salt solution in the nozzle reservoir are such that the apparatus can be left unattended during the conduction of a salt spray test.

Many modifications and variations of the invention will become apparent to those skilled in the art in view of the foregoing detailed disclosure. Therefore, it is to be understood that, within the scope of the appended claims, the invention can be practiced otherwise than as specifically shown and described.

What is claimed is:

1. In a salt spray corrosion test apparatus including a test cabinet, an aspirator nozzle within said cabinet for producing a corrosive fog spray mist, test solution reservoir means connected to said nozzle, and a bubble tower connected to said nozzle for supplying saturated atomizing air, the improvement comprising automatic control means for controlling the level of test solution in said reservoir means and the level of water in said bubble tower, said control means including a source of test solution connected to said reservoir means, said source of test solution being responsive to a decrease in volume of solution in said reservoir means, and a source of water connected to said bubble tower, said source of water being responsive to a decrease in volume of water in said bubble tower.

2. In a salt spray test corrosion apparatus including a test cabinet, an aspirator nozzle within said cabinet for producing a corrosive fog spray mist, test solution reservoir means connected to said nozzle, and a bubble tower connected to said nozzle for supplying saturated atomizing air, the improvement comprising automatic control means for controlling the level of test solution in said reservoir means and the level of water in said bubble tower, said control means including a source of test solution, means connecting said source of test solution to said reservoir means, said test solution connecting means including means for maintaining the test solution at a predetermined level in said reservoir means and for supplying fresh solution when the solution in said reservoir means is below said predetermined level, a source of water, and means connecting said source of water to said bubble tower, said water connecting means including means for maintaining the water in said bubble tower at a predetermined level and for supplying fresh amounts of water when the water in said bubble tower falls below said predetermined level.

3. In a salt spray corrosion test apparatus including a test cabinet, an aspirator nozzle within said cabinet for producing a corrosive fog spray mist, test solution reservoir means connected to said nozzle, and a bubble tower connected to said nozzle for supplying saturated atomizing air, the improvement comprising automatic control means for controlling the level of test solution in said reservoir means and the level of water in said bubble tower, said control means including a test solution storage tank disposed above said reservoir means, means for gravity feeding solution from said tank to said reservoir means when the solution in said reservoir means falls below a predetermined level, a water storage tank disposed above said bubble tower, and means for gravity feeding water from said water storage tank to said bubble tower when the water in said bubble tower falls below a predetermined level.

4. The apparatus as claimed in claim 3 wherein said means for gravity feeding the test solution comprises a liquid supply conduit connected between the bottom portion of said test solution storage tank and said reservoir means and an air control line having one end connected to a top portion of said reservoir means and another end connected to the top portion of said test solution storage tank, whereby solution will be supplied to said reservoir means when the level of solution falls below said one end of said air control line, and wherein said means for gravity feeding water comprises a water supply line connected between the bottom portion of said water storage tank and said bubble tower and a water control line connected between said bubble tower and the top of said water storage tank, said water control line having an end extending into the top of said bubble tower so that water will be supplied through said water supply line when the level of water in the bubble tower falls below said end of said water control line.

5. The apparatus as claimed in claim 4 wherein said test solution storage tank and said water storage tank are disposed externally of said test cabinet.

6. A corrosion test apparatus comprising a test cabinet, an upwardly extending tube in said cabinet, said upwardly extending tube having a lower end and an upper outlet end, an aspirator spray nozzle disposed within said cabinet for producing a corrosive fog spray mist, said nozzle being adjacent said lower end of said upwardly extending tube and oriented toward said outlet end, a test solution reservoir below said nozzle, a solution storage tank above said reservoir, a solution conduit having an end connected to the bottom portion of said solution tank and another end connected to said reservoir, a solution control line having an end connected to the top portion of said solution tank and another end extending into said reservoir, said another end of said solution conduit being no higher than said another end of said solution control line so that solution will be supplied to said reservoir when the level of solution in the reservoir falls below said another end of said solution control line, means connecting said reservoir and nozzle in fluid communication, a bubble tower, conduit means connecting said bubble tower to said aspirator nozzle for supplying saturated atomizing air, a water storage tank above said bubble tower, a water supply line having one end connected to the bottom portion of said water storage tank and an outlet end within said bubble tower, and a water control line having one end connected to the top portion of said water storage tank and another end extending into the top of said bubble tower, said outlet end of said water supply line being no higher than said another end of said water control line so that water will be supplied to said bubble tower when the level of water in said bubble tower falls below said another end of said water control line.

7. The apparatus as claimed in claim 6 wherein said outlet end of said water supply line includes means for preventing air from entering said water supply line from said bubble tower.

8. The apparatus as claimed in claim 7 wherein said reservoir is within said cabinet and wherein said water storage tank and said solution storage tank are disposed externally of said test cabinet.

9. In a corrosion test apparatus including a test cabinet, an aspirator nozzle within said cabinet for producing a corrosive fog spray mist, a reservoir connected to said nozzle for supplying a corrosion test solution, and means connected to said nozzle for supplying atomizing air, the improvement comprising automatic control means for maintaining a constant level of test solution in said reservoir, said control means comprising a source of test solution and means connecting said source to said reservoir, said connecting means including means responsive to the height of test solution in said reservoir and for supplying solution to said reservoir from said source when the solution in said reservoir falls below a predetermined level.

10. In a corrosion test apparatus including a test cabinet, an aspirator nozzle within said cabinet for producing a corrosive fog spray mist, a reservoir connected to said nozzle for supplying a corrosion test solution, and means connected to said nozzle for supplying atomizing air, the improvement comprising automatic control means for maintaining a predetermined level of solution in said reservoir, said control means including a solution storage tank disposed above said reservoir, liquid supply means connecting said storage tank to said reservoir, and control means connected between said reservoir and said tank, said control means including means for inducing a flow of liquid from said tank when the level of solution in said reservoir falls below a predetermined level.

11. In a corrosion test apparatus including a corrosion test cabinet, an aspirator nozzle within said cabinet for producing a corrosive fog spray mist, a reservoir connected to said nozzle for supplying a corrosion test solution, and means connected to said nozzle for supplying atomizing air, the improvement comprising automatic control means for maintaining a predetermined level of solution in said reservoir, said control means comprising a solution storage tank disposed above said reservoir, liquid supply means connected between the bottom portion of said tank and said reservoir, and flow control means connected to the top portion of said tank and to said reservoir, the connection of said liquid supply means to said reservoir being no higher than the connection of said flow control means so that a flow of solution is induced from said tank when the level of solution in said reservoir falls below the connection of said flow control means.

12. A corrosion test apparatus comprising a test cabinet, an upwardly extending tube in said cabinet, said upwardly extending tube having a lower end and an upper outlet end, an aspirator nozzle within said cabinet for producing a corrosive fog spray mist, means connected to said nozzle for supplying atomizing air, said nozzle being adjacent said lower end of said upwardly extending tube and oriented toward said outlet end, a test solution reservoir within said cabinet below said nozzle, an aspirator tube having one end connected to said nozzle and another end projecting into said reservoir for supplying solution to said nozzle, a solution storage tank disposed externally of said cabinet above said reservoir, a liquid supply line having one end connected to the bottom of said tank and an outlet end within said reservoir, and a control line having one end connected to the top of said tank and another end projecting into said reservoir, said another end of said control line being disposed above said another end of said aspirator tube and substantially at the height of said outlet end of said liquid supply line so that solution will flow into said reservoir from said tank when the level of solution in said reservoir falls below said another end of said control line.

13. In a corrosion test apparatus including a corrosion test cabinet, an aspirator nozzle within said cabinet for producing a corrosive fog spray mist, means connected to said nozzle for supplying a corrosion test solution, and a bubble tower connected to said nozzle for supplying saturated atomizing air, the improvement comprising automatic control means for maintaining a constant level of water in said bubble tower, said control means comprising a source of water and means connecting said source of water to said bubble tower, said connecting means including means responsive to the level of water in said bubble tower whereby water is supplied to said bubble tower when the level of water therein falls below a predetermined level.

14. In a corrosion test apparatus including a corrosion test cabinet, an aspirator nozzle within said cabinet for producing a corrosive fog spray mist, means connected to said nozzle for supplying a corrosion test solution, and a bubble tower connected to said nozzle for supplying saturated atomizing air, the improvement comprising automatic control means for maintaining a constant predetermined level of water in said bubble tower, said control means comprising a source of water disposed above said bubble tower, liquid supply means connected between said source of water and said bubble tower, and control means connected between said bubble tower and said source of water for inducing a flow of water to said bubble tower when the water therein falls below a predetermined level.

15. In a corrosion test apparatus including a test cabinet, an aspirator nozzle within said cabinet for producing a corrosive fog spray mist, means connected to said nozzle for supplying a corrosion test solution, and a bubble tower connected to said nozzle for supplying saturated atomized air, the improvement comprising automatic control means for maintaining a constant predetermined level of water in said bubble tower, said control means comprising a water storage tank disposed above said tower, a liquid supply conduit having one end connected to the bottom of said tank and an outlet end projecting into said water tower, and a control line having one end connected to the top of said tank and another end projecting into said water tower, said outlet end of said liquid supply conduit being no higher than said another and of said control line so that water will be supplied to said tower from said tank when the water in said tower falls below said another end of said control line.

16. A corrosion test apparatus comprising a test cabinet, an upwardly extending tube in said cabinet, said upwardly extending tube having a lower end and an upper outlet end, an aspirator nozzle within said cabinet for producing a corrosive fog spray mist, said nozzle being adjacent said lower end of said upwardly extending tube and oriented toward said outlet end, means connected to said nozzle for supplying a corrosion test solution, a bubble tower for containing a column of water, an air supply conduit connected between said aspirator nozzle and the top portion of said tower above the level of water therein, a water storage tank disposed above said tower, a liquid supply conduit having one end connected to the bottom of said tank and an outlet end within said tower, and a control line having one end connected to the top of said tank and another end projecting into the top of said tower, said outlet end of said liquid supply conduit being no higher than said another end of said control line so that water will be supplied to said tower when the column of water falls below said another end of said control line.

17. The apparatus as claimed in claim 16 wherein said outlet end of said liquid supply conduit includes means for preventing air from entering said conduit from said bubble tower.

References Cited by the Examiner

UNITED STATES PATENTS

| | | | |
|---|---|---|---|
| 1,972,962 | 9/34 | Weber | 137—453 X |
| 2,699,927 | 1/55 | Gilroy et al. | 261—121 X |

OTHER REFERENCES

Hess: "An Accelerated Corrosion Test Chamber," Corrosion Prevention and Control, vol. 5, April 1958, pages 47–51.

MORRIS O. WOLK, *Primary Examiner.*

JAMES H. TAYMAN, Jr., *Examiner.*